Oct. 7, 1952 — J. C. COLEMAN — 2,612,714
FISHING REEL SEAT
Filed July 8, 1949
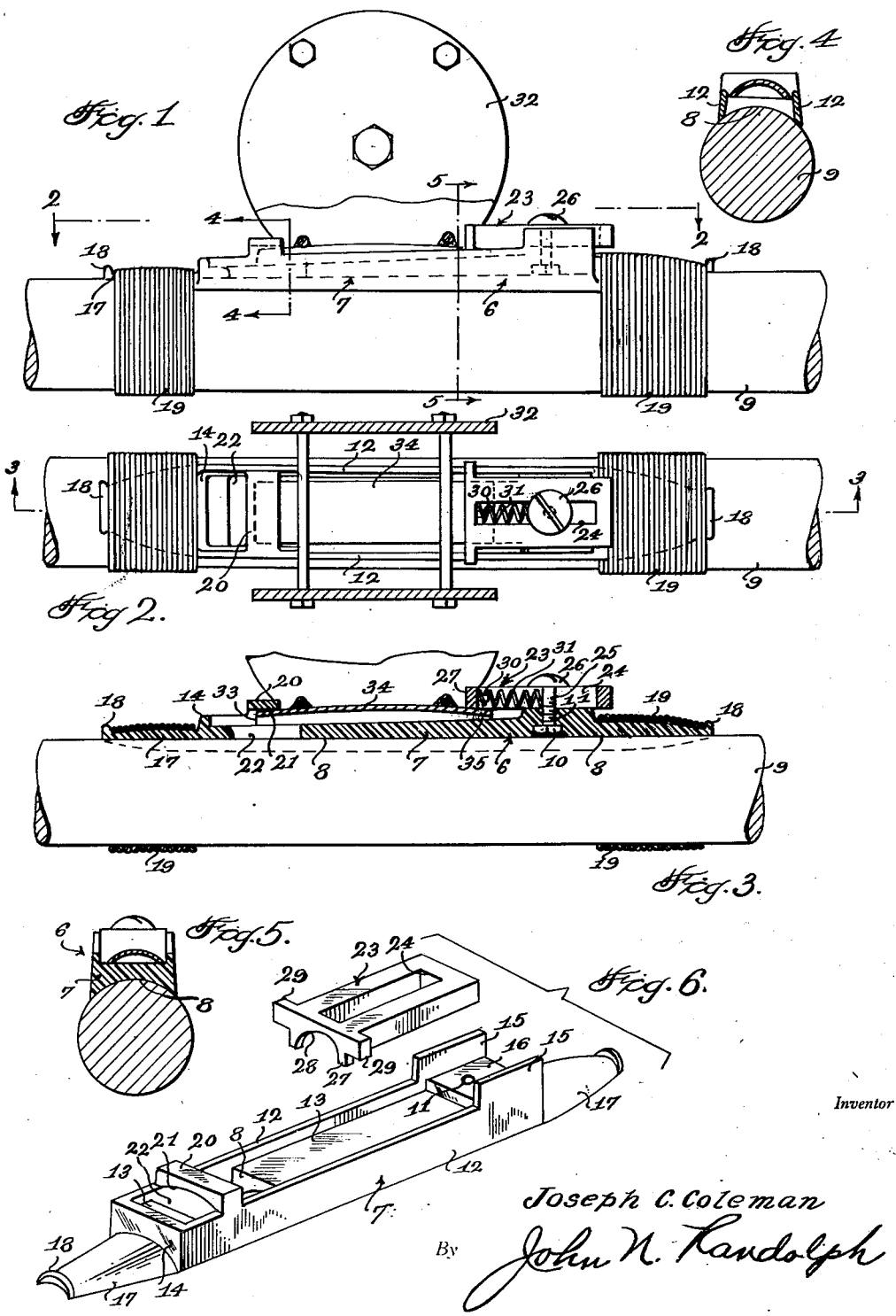
Inventor
Joseph C. Coleman
By John N. Randolph
Attorney Patented Oct. 7, 1952

2,612,714

UNITED STATES PATENT OFFICE 2,612,714

FISHING REEL SEAT

Joseph C. Coleman, Kokomo, Ind.

Application July 8, 1949, Serial No. 103,723

3 Claims. (Cl. 43—22)

This invention relates to a novel fishing reel seat capable of being quickly and easily secured to a fishing pole or rod to provide a means for detachably mounting a reel thereon and which will enable the reel to be quickly and easily applied or removed.

More particularly, it is an aim of the present invention to provide a reel seat of extremely simple construction which will effectively function to securely hold a reel thereon but which will enable the reel to be quickly applied thereto or removed therefrom.

Various other objects and advantages of the invention will hereinafter become more fully apparent from the following description of the drawing, illustrating a presently preferred embodiment thereof, and wherein:

Figure 1 is a side elevational view showing the reel seat in an applied position and showing a conventional fishing reel demountably supported thereon;

Figure 2 is a horizontal sectional view taken substantially along a plane as indicated by the line 2—2 of Figure 1;

Figure 3 is a longitudinal substantially central sectional view of the reel seat taken substantially along a plane as indicated by the line 3—3 of Figure 2;

Figures 4 and 5 are cross sectional views of the reel seat taken substantially along planes as indicated by the lines 4—4 and 5—5, respectively, of Figure 1, and Figure 6 is an exploded perspective view of certain of the parts of the reel seat.

Referring more specifically to the drawing, the novel reel seat in its entirety and comprising the invention, is designated generally 6 and includes an elongated bar or body member 7 having an underside 8 which is concave in cross section, as seen in Figures 4 and 5 and which is adapted to seat flush on a portion of a fishing pole or rod 9 and to be disposed longitudinally thereof, as illustrated in Figures 1, 2 and 3.

Said body member or bar 7 may be formed of a molded material, such as plastic or may be formed of a cast metal, such as aluminum and has a nut 10 molded or cast in the bottom thereof and a bore 11 which communicates with said nut 10 and which opens outwardly of the upper side of the reel seat body 7.

As best seen in Figure 6, the reel seat body 7 is provided with substantially parallel side walls 12 having upper edges extending to above the level of the upper surface 13 of the body 7. The body 7 is provided with a front wall 14 which extends transversely between the forward ends of the side walls 12 and which likewise rises to above the level of the upper body surface 13. The side walls 12 at their rear ends are provided with upwardly projecting extensions 15 and the upper body surface 13 is provided with an upwardly offset surface 16 which is located between the wall extensions 15 and through which the bore 11 opens.

Beyond the rear end of the surface 16 and beyond the front wall 14, the body member 7 is provided with corresponding end portions 17 which taper in width toward their outer ends and the upper surfaces of which are inclined downwardly and outwardly. Said upper surfaces of the ends 17 terminate at their outer ends in upturned retaining flanges 18. The end portions 17 of the body member 7 are adapted to receive wrappings 19 which extend around the pole or rod 9, and around the upper surfaces of said end portions 17 for securing the reel seat 6 to the rod or pole 9. The retaining flange 18 of the forward end portion 17 cooperates with the front wall 14 to retain the wrapping 19 thereon and the retaining flange 18 of the rear end portion 17 cooperates with the rearwardly facing shoulder defined by the rear end of the upwardly offset top surface 16 to retain the other wrapping 19 in engagement with said last mentioned rear body portion 17.

The body member 7 rearwardly of but adjacent the front wall 14 is provided with an integral transversely extending strap member 20 which extends between the upper edges of the side walls 12 and which is upwardly offset with respect thereto. The strap member 20 has an upwardly bowed bottom surface 21. The body member 7 may be provided with an opening 22 beneath the strap member 20 and between its side walls 12.

An elongated slide, designated generally 23 is mounted for longitudinal sliding movement on the body member 7 between portions of the walls 12 and their upper extensions 15. Said slide 23 is provided with an elongated opening 24 which extends longitudinally thereof for loosely receiving the shank 25 of a screw which extends downwardly therethrough and through the bore 11 the threaded terminal portion of which engages the nut 10. The head 26 of the screw shank 25 has portions of its underside bearing on the upper surface of the slide 23 or disposed thereabove. The slide 23 is provided with a forward end wall 27 which depends below the level of the remainder of the bottom surface of said slide 23 for engaging on the top surface 13, whereas the remainder of said slide slidably engages the upwardly offset top surface 16. Said front end wall 27 is provided with an upwardly bowed, downwardly opening recess 28 which extends transversely of the slide 23, for a purpose which will hereinafter become apparent. The front wall 27 is also provided with lateral extensions or wings 29 which slidably engage on the upper edges of the side walls 12.

The inner side of the wall 27 is provided with a rearwardly extending projection 30 which extends into the forward end of the slot 24 for receiving the forward end of an expansion coiled spring 31 which is disposed longitudinally in said slot 24 and the rear end of which bears against the screw shank 25 and is held against upward displacement by the screw head 26. Accordingly, it will be readily apparent that when the screw 25, 26 is loosened, the spring 31 will tend to project the slide 23 toward the forward end of the reel seat body 7, the possible movement of said slide forwardly of the body 7 being limited by the engagement of the screw shank 25 with the rear end of the slot 24.

To apply a conventional fishing reel 32 to the reel seat 6, so as to thereby mount it on the fishing pole or rod 9, one of the downwardly inclined ends 33 of the reel base 34 is inserted downwardly and forwardly into the reel seat 6 between the side walls 12 and beneath the strap 20, which forms a stationary keeper, after first retracting the slide 23 rearwardly, against the action of its spring 31. Said forward end 33 of the reel base 34 will either bind against the arcuate underside 21 of the keeper strap 20 and be held thereby spaced from the front wall 14 or will abut against said front wall. The rear end 35 of the reel base 34, which corresponds to the front end 33, is then swung downwardly into the channel formed by the side walls 12 and upper surface 13, which can be accomplished while manually holding the slide 23 in a retracted position or while said slide is held retracted by the screw 25, 26 being tightened for clamping it in a retracted position. Thereafter, the slide 23 is released so that it can be projected forwardly by the spring 31 until the upper, outwardly inclined surface of the reel base end 35 by wedging engagement with the groove 28 prevents further movement of the slide 23 in a forward direction. It will thus be seen that the reel base 34 will thus be securely clamped in the reel seat 6 and may be positively retained against accidental displacement therefrom by thereafter tightening the screw 25, 26. However, with said screw loosened the slide can be readily grasped as by its wing members 29 and retracted to permit the reel 32 to be quickly and easily removed from the reel seat 6.

Various modifications and changes are contemplated and may obviously be resorted to, without departing from the spirit or scope of the invention as hereinafter defined by the appended claims.

I claim as my invention:

1. The combination with a fishing reel base having end portions provided with outwardly and downwardly inclined upper sides, of a fishing reel seat comprising a bar having upstanding side walls defining a longitudinally extending channel portion receiving the fishing reel base, a strap member secured to the bar and disposed above the channel portion, said strap member extending across the channel portion adjacent to and spaced from one end thereof and forming a stationary keeper engaging a part of the upper surface of one end of the downwardly curved reel base, a slide slidably connected to the channel portion adjacent its opposite end and movable toward and away from the stationary keeper, said slide being guided in movement between two upstanding extensions of the side walls, said slide having an end wall located at the end thereof adjacent the stationary keeper and extending transversely of the channel portion, said end wall having an intermediate portion disposed above the channel portion and engaging on a part of the upper surface of the other end of the reel base, said end wall being provided with a downwardly directed arcuate grooved surface for engagement over and wedging engagement with the other end of the reel base, said slide being resiliently biased toward said stationary keeper in order to effect said engagement.

2. A reel seat as in claim 1, a spring yieldably urging the slide toward the stationary keeper, and a fastening engaging and detachably clamping the slide in either a projected or retracted position and combining with said spring to form releasable retaining means for the slide.

3. A reel seat as in claim 1, said slide comprising a movable keeper, and spring means yieldably urging the slide toward said stationary keeper and constituting means for releasably retaining the slide in engagement with the reel base.

JOSEPH C. COLEMAN.

REFERENCES CITED

The following references are of record in the file of this patent:

UNITED STATES PATENTS

| Number | Name | Date |
| --- | --- | --- |
| 441,126 | Boone | Nov. 25, 1890 |
| 676,348 | Bell | June 11, 1901 |
| 1,154,123 | Manning | Sept. 21, 1915 |
| 1,843,714 | Fuller | Feb. 2, 1932 |
| 2,230,229 | Benson | Feb. 4, 1941 |
| 2,289,216 | Seidel | July 7, 1942 |

FOREIGN PATENTS

| Number | Country | Date |
| --- | --- | --- |
| 1,766 | Great Britain | of 1881 |